July 23, 1957  V. G. ANDERSON  2,799,938
EVALUATING DEVICE
Filed Feb. 9, 1954
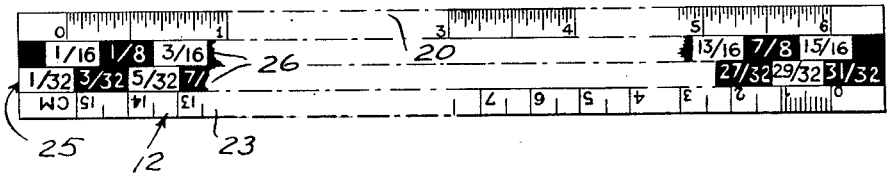
Fig. 1.
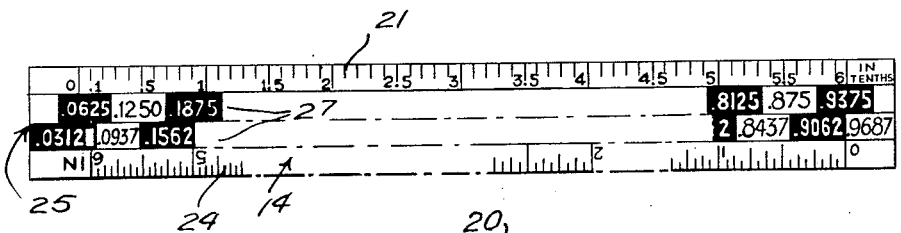
Fig. 2.
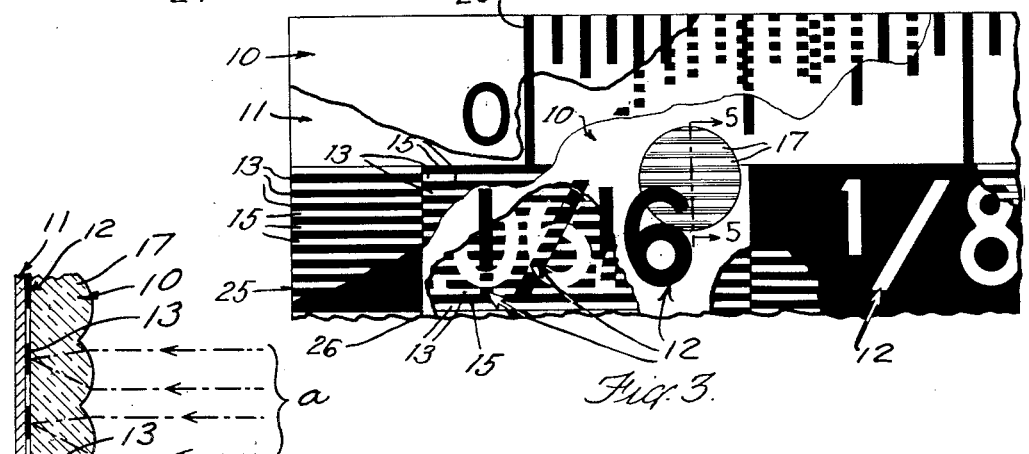
Fig. 3.
Fig. 5.
Fig. 4.
INVENTOR
VICTOR G. ANDERSON
BY
ATTORNEY

United States Patent Office 2,799,938
Patented July 23, 1957

2,799,938
EVALUATING DEVICE

Victor G. Anderson, New Rochelle, N. Y., assignor to Pictorial Productions, Inc., Tuckahoe, N. Y., a corporation of New York Application February 9, 1954, Serial No. 409,036

7 Claims. (Cl. 33—107)

The present invention relates to tables, scales, guages and similar evaluating devices, in which a collection or set of related numbers, signs, graduations, values, dimensions, measures or items of any kind are collected and arranged in orderly sequence to facilitate ready reference thereto. Such tables may, for example, take the form of conversion tables, dimensional tables, mathematical tables, physical tables, equivalency tables, statistical tables and comparison tables and such scales may take the form of measuring and calculating rules, gauges and the like having equivalent graduations and scales.

In tables and scales of the type indicated, it is the desideratum to arrange the items of information or evaluation in such condensed and compact form as to reduce the printing space occupied thereby to a minimum and to relate them positionally, so that they can be comprehensively viewed for ready reference. In spite of the need for compactness in such an evaluating device, the related items have hitherto occupied different spaces, so that if the device contained two tabulations of related items or two related scales, these conjointly occupied as much space as would be occupied by the two tabulations or scales severally.

One object of the present invention is to provide an evaluating device of the general type described, so constructionally designed and having its items of evaluation so arranged, as to occupy a minimum of printing space and as to allow quick and convenient reference to related items.

The evaluating device of the present invention comprises a transparent lenticular viewing screen having a smooth rear face and having on its front face a series of very fine contiguous parallel convolutions constituting segments of optical cylinders to define lens elements, and a backing for said screen, such as a sheet, having a printed or charted surface in face to face contact with the smooth side of said screen and open to view through said screen. This printed screen backing presents at least two alternate series of spaced complemental image dots or parallel lines, each series constituting a dissection of a master scale or table containing one set of evaluating items. The two series of image lines or dots are so positionally and optically related with respect to the lens elements of the viewing screen, as to be successively and alternately visible as coherent scales or tables, upon positional change of the angle of the evaluating device with respect to the line of vision. With an evaluating device of this type, one table or scale is comprehensively visible at one time, and by changing slightly the angle of the line of vision with respect to the device, this table or scale is blanked out of view, while the other table or scale simultaneously comes into view. Related items in the two tables or scales occupy the same space, only the items of one table or scale being visible at one time. A person, therefore, looking at one item of a table or scale in a restricted space in the evaluating device, can see the related item of the other table or scale in the same space, by simply tilting the device slightly or changing the position of his head to a small degree. This operation will blot out the first item observed and simultaneously bring into view the related item, without changing the field of observation. This arrangement permits a large number of items to be included in a restricted space and permits ready and convenient reference to these items.

Various other objects, features and advantages of the invention are apparent from the following particular description and from inspection of the accompanying drawings, in which Figure 1 is a face view of an evaluating device embodying the present invention, said device being shown in one angular position relative to the line of sight, to expose to view one set of items;

Fig. 2 is a face view of the evaluating device of Fig. 1, but showing said device in another angular position relative to the line of sight, to expose to view the other set of items;

Fig. 3 is a face view of an enlarged end portion of Fig. 1, showing parts of the lenticular viewing screen removed to expose part of the printed face of the backing, and showing the position of the evaluating device corresponding to that of Fig. 1, to expose to view one set of items;

Fig. 4 is a face view of an enlarged end portion of Fig. 2, showing the position of the evaluating device corresponding to that of Fig. 2, to expose to view the other set of items; and Fig. 5 is a section of the evaluating device taken on line 5–5 of Fig. 3 but showing said device on a larger scale.

Referring to the drawings, the evaluating device of the present invention is shown embodied in the specific form of a rule for purposes of illustration. This evaluating device, in general, comprises a transparent lenticular viewing screen 10, and a charted backing 11, shown in the form of a print sheet, disposed behind said screen as to be exposed therethrough and affixed thereto, in any suitable manner, as for example, by transparent or colorless adhesive. The front face of this sheet 11 has printed thereon two or more evaluating representations in the form of scales and/or tabulations, only two of these representations 12 and 14 being shown for purposes of illustration. One of these representations 12 is resolved into a series of spaced imaginal components 13, which may be either a series of small dots, if the print sheet 11 is a half-tone photo-engraving or a grating of fine parallel lines, as shown, where the print sheet is a simple line photo-engraving or impression. The other representation 14 is also resolved into a series of spaced imaginal components 15, shown as a grating of fine parallel lines alternately disposed with respect to the image lines 13.

The lenticular screen 10 is made of transparent material such as cellulose acetate and has formed on the front face thereof a series of contiguous segments of cylinders defining lens elements 17 extending parallel to the lineations 13 and 15 on the print sheet 11. The screen 10 and the print sheet 11 have lenticular and line rulings multiply related according to the number of representations on said print sheet. For example, if the viewing screen 10 has 64 lens elements 17 per inch and if the print sheet 11 has only two representations printed thereon, as in the specific embodiment shown, this sheet would have 128 imaginal component lines per inch and each pair of adjoining image lines 13 and 15 would be disposed behind a corresponding lens element 17. With this arrangement, the screen 10 and the print sheet 11 will be in optical registry or coincidence, to cause the imaginal component lines 13 of the representation 12 to be optically composed and to come into view as a coherent and comprehensive image and the imaginal component lines 15 of the other representation 14 to be blanked out of view, when the evaluating device is in one angular position with respect to the line of vision, and to cause the imaginal component lines 15 of the other representation 14 to be optically composed and to come into view as a coherent and comprehensive image and the imaginal component lines 13 of the representation 12 to be blanked out, when the angular position of the evaluating device is changed with respect to the line of vision. The image rays by which the different representations 12 and 14 are brought separately and independently into view through the lenticular viewing screen 10 by reason of a change in the angle of observation are indicated by dot and dash lines *a* and *b* in Fig. 5.

The evaluating device of the present invention may take the form of a rule or gauge, having a series of calibrations according to one system and a series of equivalent calibrations according to another system. For example, in the specific form shown, the rule has along one edge a scale 20 (Figs. 1 and 3), which is based on the English linear system of inches and which is subdivided into thirty-seconds of an inch and a scale 21 (Figs. 2 and 4) which is also based on the English linear system of inches but which is subdivided into tenths of an inch. The two scales 20 and 21 constituting parts of the representations 12 and 14 respectively, are superposed to correspond to the same lengths and can be brought successively and alternately into view by changing slightly the angle of the line of vision with respect to the viewing screen 10. Either scale can thereby be conveniently used and linear values determined in either thirty-seconds of an inch or in tenths of an inch.

Also, the rule is shown for the purpose of illustration, containing along its other edge a linear metrical scale 23 (Fig. 1) constituting part of the representation 12 and a corresponding English linear scale 24 (Figs. 2 and 4) superposed thereon and constituting part of the representation 14, the two scales being brought successively and alternately into view by changing slightly the angle of the line of vision with respect thereto.

In addition, the rule is shown for the purpose of illustration with an evaluating tabular scheme 25 extending therealong for converting units from one system to another. In the specific form illustrated, this tabular scheme 25 shows decimal equivalents of fractions of one inch and comprises one table 26 (Figs. 1 and 3) constituting part of the representation 12 and indicating the fractional items 1/16, 1/8, 3/16 etc., arranged in two offset rows in respective panels and another table 27 (Figs. 2 and 4) constituting part of the representation 14 and indicating the equivalent items .0625, .1250, .1875 etc., these being also arranged in two offset rows in respective panels and superposed upon the table 26, so that each decimal appears in the panel of the corresponding fraction.

As an additional feature, the two tables 26 and 27 appear in contrasting colors, so that the switch-over from one view shown in Figs. 1 and 3 to the other view shown in Figs. 2 and 4, upon change of the angle of the line of vision with respect to the evaluating device, becomes acutely and sharply discernible. For example, the imaginal component lines 12 of a fractional item in the table 26 may be dark on a light background in a panel of said table and this background will have printed thereon light imaginal component lines 15 alternately located with respect to the dark imaginal component lines 13 of said fractional item and defining in said panel a lineless equivalent decimal item of light color corresponding to that of said background, as shown in Fig. 3. In this color plan, the dark colors may, for example, be black, and the light colors may, for example, be yellow. When the evaluating device is held in one angular position with respect to the line of vision, the fractional item referred to will appear in black upon a yellow background in the panel and upon change in this angular position, the equivalent decimal item will appear in said panel in yellow upon a black background.

To present color contrast between adjoining items in the same row of the same table, and to afford thereby greater visibility and greater ease in selecting an item in said table for evaluation, alternate items in the same row of each table are of the same viewable color and are located on respective panels all having the same viewable background color contrasting with the viewable color of said items, and the items intervening between these alternate items in this row of the table are all of the same viewable color, contrasting with the viewable color of said alternate items and are located on respective panels all having the same viewable background color contrasting with the viewable color of said intervening items.

With the color scheme and arrangement described, a particular item in a panel of a table may be picked up quickly by the eye, since the color of the item as viewed through the lenticular viewing screen 10 contrasts with the background color of its panel as viewed at the same time through said screen, and contrasts with the color of the adjoining items viewable at the same time through said screen, while the viewed color of this panel contrasts with the color of the flanking panels viewable at the same time. If, for example, the selected item in a panel of a table is viewed in black on a yellow background, the items on either side will appear at the same time in yellow on black backgrounds. By changing slightly the angle of the line of vision with respect to the evaluating device, the selected item in this panel will be blotted out and the related item in the other table will come into view in this panel but in yellow on a black background. At the same time, the flanking panels of this other table come into view with attendant reversal in viewable color, so that color contrasts in the manner described are maintained in either viewable position of the evaluating device with respect to the angle of the line of vision.

In view of the fact that the field of observation remains the same in running down related items, and in view of the contrasts in color presented as described, ready and convenient reference to the two tables is afforded by the evaluating device of the present invention. Also, since related scales and related tables occupy coextensive spacing, the evaluating device of the present invention is more compact and more condensed than is possible with evaluating devices hitherto known.

Although the invention has been described as embodied in a rule and as applied to scales and decimal-fraction equivalent tables, it is not limited thereto. The principles of the present invention may be applied to any evaluating device containing a collection or set of related items by which reference from one item to a related item, may be made for study, calculation and/or information. For example, the evaluating device may take the form of mathematical tables, such as contain trigonometric functions and values, physical tables such as those containing physical constant and units, dimensional tables such as those for determining areas, circumferences, pipe measurements, etc., from radii or diameters, tables of measurements, tables of equivalents or conversions, chemical tables, as for example, those indicating atomic weights of chemical elements, statistical tables, etc. Also, instead of having an evaluating device with two tables coming successively into view, the device may have three or more tables, which come successively into view, this being attained in the manner made apparent, by increasing the number of component image lines perceived successively under each lens element of the lenticular viewing screen of the evaluating device, this requiring finer component image lines closer together or lens elements of wider angle.

The printed sheet 11 of the evaluating device may be made in any suitable manner. For example, an image of a table from a master chart may be projected photographically through a lineated screen bearing a single series of spaced parallel opaque lines corresponding to the lenticulations of the viewing screen 10, and on to the emulsion or sensitized face of a negative plate in face contact with said lineated screen or at least close enough thereto to assure exposure of said plate along strip areas corresponding exactly with the areas of the interlinear spaces of the lineated screen. This lineated screen is then moved relative to the negative plate in the direction at right angles to its lines a distance equal to the width of an interlinear space on said lineated screen, assuming that the screen lines are of equal width and are equally spaced a distance equal to their width, and assuming that the evaluating device is to contain two tables. By this operation, the linear areas on the negative plate which have been previously photographically exposed to the image of the master chart described are covered by the lines of the lineated screen, while the linear areas on said negative plate previously covered by said screen lines are now exposed for photographic projection. In this new relative position of the negative plate and the lineated screen, an image of a second table from a master chart related to the first table referred to is projected photographically through said screen and on to said negative plate. From this doubly exposed negative plate, a photo-engraving plate can be made in the manner well-known in the photo-engraving art. From this photo-engraving plate, the impression can be printed on the backing sheet 11.

While the invention has been described with particular reference to a specific embodiment, it is to be understood that it is not to be limited thereto but is to be construed broadly and restricted solely by the scope of the appended claims.

What is claimed is:

1. An evaluating device comprising a lenticular viewing screen having a series of parallel longitudinal lens elements and a print behind said screen for exposure therethrough having printed thereon spaced image components of two representations, each of said representations bearing a series of evaluating items, such as numbers, signs and graduations arranged in orderly sequence, the two representations having items related for study, calculation and/or information, each item of one representation being superimposed upon the item related thereto of the other representation, and said image components being optically related to the lens elements of said screen to cause one representation to be optically composed and to be viewed as a coherent and comprehensive image and the other representation to be blanked out of view, in one position of the evaluating device with respect to the angle of the line of vision, and to cause the appearance of the latter representation as a coherent and comprehensive image and the disappearance of the other representation from view, upon change in the position of the evaluating device with respect to the angle of the line of vision.

2. An evaluating device as described in claim 1, wherein the image components are in the form of a series of spaced parallel image lines parallel to the lens elements of the viewing screen, the image lines of one representation alternating with those of the other representation, and each pair of adjoining image lines from the two representations being located behind the same lens element of the lenticular viewing screen, whereby only one of said pair of image lines will come into view according to the angle of the line of vision in relation to the evaluating device.

3. An evaluating device as described in claim 1, wherein said representations are related scales superposed upon each other.

4. An evaluating device as described in claim 1, wherein said device is in the form of a rule and said representations are related scales superposed upon each other.

5. An evaluating device as described in claim 1, wherein said representations are related tables superposed upon each other.

6. An evaluating device as described in claim 1, wherein (1) each of said items apears in color contrasting with the color of its background and contrasting with the viewable color of the related item, (2) the latter item appears in color contrasting with the viewable color of its background and (3) the viewable color of the latter background contrasts with the viewable color of the other background.

7. An evaluating device as described in claim 6, wherein (1) adjoining items in the same representation appear in contrasting colors, and (2) adjoining backgrounds for the latter items appear in contrasting colors.

References Cited in the file of this patent

UNITED STATES PATENTS

| 1,150,374 | Kanolt | Aug. 17, 1915 |
| 1,475,430 | Curwen | Nov. 27, 1923 |
| 1,602,490 | Homan | Oct. 12, 1926 |

FOREIGN PATENTS

| 240,573 | Great Britain | Oct. 8, 1925 |